(12) United States Patent
Elder

(10) Patent No.: US 9,189,287 B1
(45) Date of Patent: Nov. 17, 2015

(54) HARNESSING IDLE COMPUTING RESOURCES IN CUSTOMER PREMISE EQUIPMENT

(75) Inventor: Derek Elder, Alpharetta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 110 days.

(21) Appl. No.: 13/534,040

(22) Filed: Jun. 27, 2012

(51) Int. Cl.
  *G06F 9/46* (2006.01)
  *G06F 9/50* (2006.01)

(52) U.S. Cl.
  CPC ............ *G06F 9/5066* (2013.01); *G06F 9/5072* (2013.01); *G06F 9/5038* (2013.01)

(58) Field of Classification Search
  CPC ... G06F 9/5027; G06F 9/5066; G06F 9/5038; G06F 9/5044
  See application file for complete search history.

(56) References Cited

U.S. PATENT DOCUMENTS

| | | | | |
|---|---|---|---|---|
| 6,192,388 B1 * | 2/2001 | Cajolet | ......................... | 718/100 |
| 7,797,368 B1 * | 9/2010 | Gadkari | ......................... | 709/201 |
| 8,250,572 B2 * | 8/2012 | Dahlstedt | ......................... | 718/1 |
| 2004/0148605 A1 * | 7/2004 | Kim | ............................. | 718/100 |
| 2007/0016907 A1 * | 1/2007 | Benedetti et al. | ............. | 718/104 |
| 2010/0083303 A1 * | 4/2010 | Redei et al. | ..................... | 725/32 |
| 2013/0254815 A1 * | 9/2013 | Pfeffer et al. | ................... | 725/96 |
| 2013/0275545 A1 * | 10/2013 | Baptist et al. | ................. | 709/215 |

OTHER PUBLICATIONS

U.S. Appl. No. 61/569,387 associated with published patent application 2013/0275545 (Baptist). Wesley Leggette, Andrew Baptist, Greg Dhuse, Jason Resch, Ilya Volvoski, Manish Motwani, S. Gladwin, Gary Grube, Thomas Shirley, and Timothy Markison. Dec. 12, 2011, Drawings.*

U.S. Appl. No. 61/569,387 associated with published patent application 2013/0275545 (Baptist). Wesley Leggette, Andrew Baptist, Greg Dhuse, Jason Resch, Ilya Volvoski, Manish Motwani, S. Gladwin, Gary Grube, Thomas Shirley, and Timothy Markison. Dec. 12, 2011, Specification.*

* cited by examiner

*Primary Examiner* — Van Nguyen
*Assistant Examiner* — Jacob Dascomb
(74) *Attorney, Agent, or Firm* — Bart A. Perkins

(57) ABSTRACT

Methods, systems, and computer readable media can provide for harnessing of computing resources in customer premise equipment devices. This can be facilitated by dividing large processing tasks into minor tasks, sending the minor tasks to customer premise equipment devices, and compiling the results of the minor tasks completed by the devices.

25 Claims, 4 Drawing Sheets

HARNESSING IDLE COMPUTING RESOURCES IN CUSTOMER PREMISE EQUIPMENT

TECHNICAL FIELD

This disclosure relates to using computing resources of customer premise equipment devices connected to a network to complete large processing tasks.

BACKGROUND

Many broadband service delivery providers have a resident network interface unit on their customers' premises. For example, multiple services operator (MSO) customers receive data traffic and content signals from a hybrid fiber-coaxial (HFC) network through customer premise equipment (CPE) devices, including cable modems, embedded multimedia terminal adapters, set top boxes, etc. New generations of CPE devices have increasingly large processing capabilities and computing resources to manage services offered by service providers. These CPE devices typically include powerful processing mechanisms to provide complicated signal processing to send and receive data and sometimes telephony signals including encryption and modulation techniques. However, the full capabilities of these CPE device resources are typically not utilized.

BRIEF DESCRIPTION OF THE DRAWINGS

Like reference numbers and designations in the various drawings indicate like elements.

DETAILED DESCRIPTION

In some implementations of this disclosure, systems and methods can operate to harness computing resources in CPE devices. The capabilities of processors in CPE devices continually grow, but these increased capabilities can be in excess of the capability needed by the devices to complete their normal operations. In other instances, the computing resources of the CPE devices often may remain idle when the devices are not in use. Service providers generally have a large number of CPE devices connected to their networks, and harnessing the unused capabilities of these devices can allow service providers to apportion large computing tasks such as video transcoding, or to lease idle computing resources to a third party.

Figure 1:
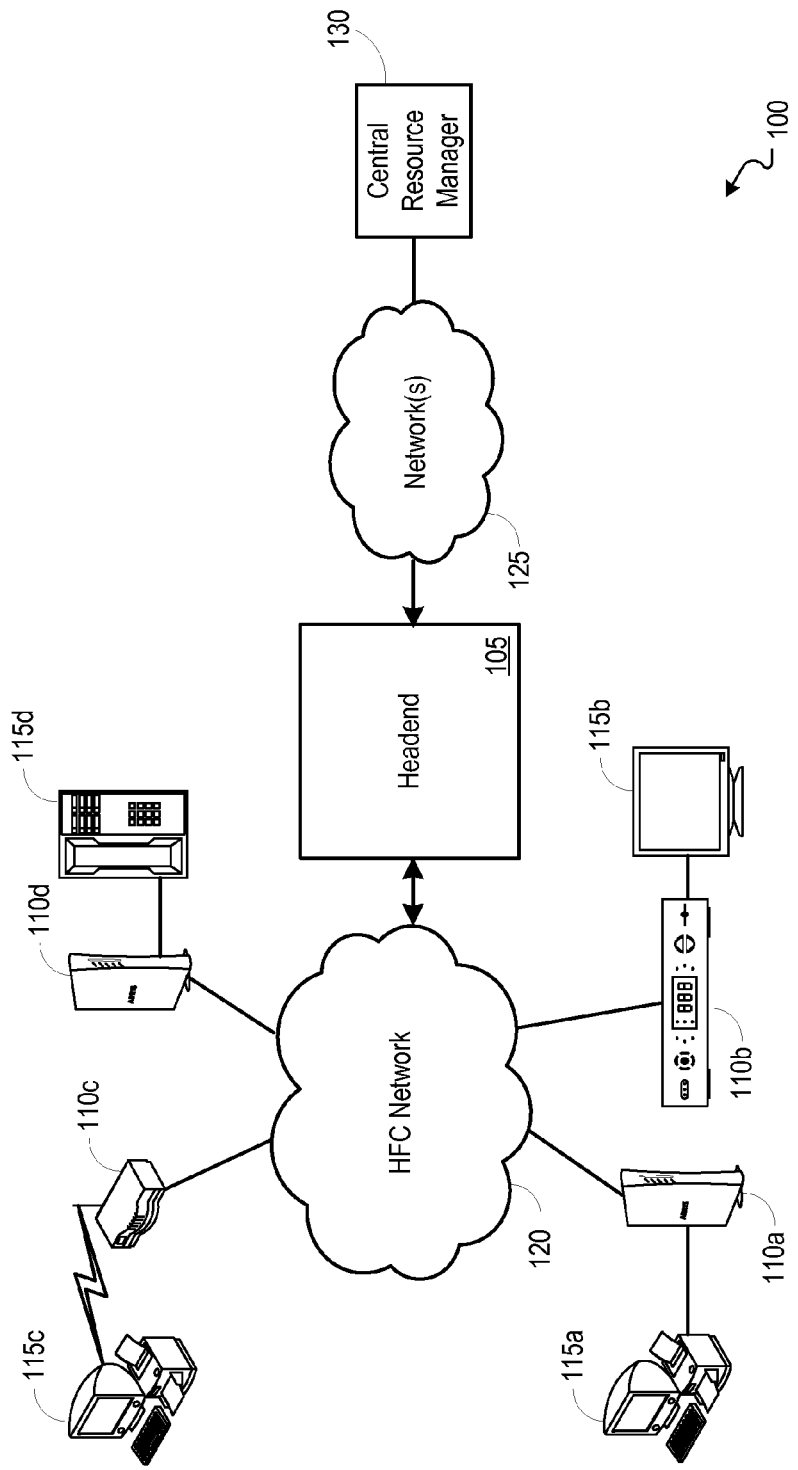
FIG. 1 is a block diagram illustrating an example network environment operable to facilitate harnessing of computing resources in CPE devices.

FIG. 1 is a block diagram illustrating an example network environment 100 operable to facilitate harnessing of computing resources in CPE devices. In some implementations, a headend 105 can provide video, data and/or voice service(s) to customer premise equipment (CPE) devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among many others (e.g., digital subscriber line (DSL) modem, voice over internet protocol (VoIP) terminal adapter, whole home gateway/digital video recorder device, communications device, etc.). A cable modem or embedded MTA (eMTA) 110a can facilitate communications between the headend 105 and a computer 115a. A set top box 110b can facilitate communications from the headend 105 to a television or a separate digital video recorder. A wireless router 110c can facilitate wireless communications between a computer 115c and a headend 105. An MTA 110d can facilitate communications between a telephone 115d and a headend 105. The CPE devices 110a-d can communicate with the headend 105 via a hybrid fiber-coax (HFC) network 120, or other type of network (e.g., digital subscriber line (DSL), IEEE 802.11, cellular, etc.).

The headend 105 can also facilitate communications between a central resource manager 130 that is connected to a network 125 and a CPE device 110a-d that is connected to a HFC network 120. In some implementations, an MSO can use the central resource manager 130 to complete large processing tasks (e.g., video transcoding, non-real-time computing tasks, etc.) by apportioning the tasks to the available resources of the CPE devices 110a-d connected to the HFC network 120, or other network. In other implementations, an MSO can lease the central resource manager 130 and available computing resources of the CPE devices 110a-d connected to the HFC network 120 (or another network) to a third party.

In some implementations, an MSO can complete a real-time processing task in a continuous action by apportioning the task (e.g., video transcoding) to CPE devices and requesting that the CPE devices allocate all of their available resources to completing the task. For example, the central resource manager 130 can apportion the real-time processing task only to CPE devices that are idle or are not being used. In some implementations, CPE devices can be identified as idle if they have not requested to transmit data for a predetermined period of time or if they have not requested to transmit more than a nominal amount of data over a predetermined time period. In other implementations, CPE devices can periodically report their status to the central resource manager 130. In another implementation, the central resource manager 130 can request a status report from each CPE device, and each CPE device can send a response informing the central resource manager 130 as to whether it is idle or busy and/or the amount of its computing resources being used. In some implementations, the central resource manager 130 can forecast or predict the status of each CPE device based upon the activity history of the CPE devices. For example, if a CPE device is typically idle during the hours between 12 a.m. and 8 a.m., the central resource manager 130 can assign a task to the CPE device to be completed between these hours. In another implementation, the central resource manager 130 can prioritize the real-time processing task in order to instruct the CPE devices to allocate all of their computing resources to completing the processing task.

Figure 2:
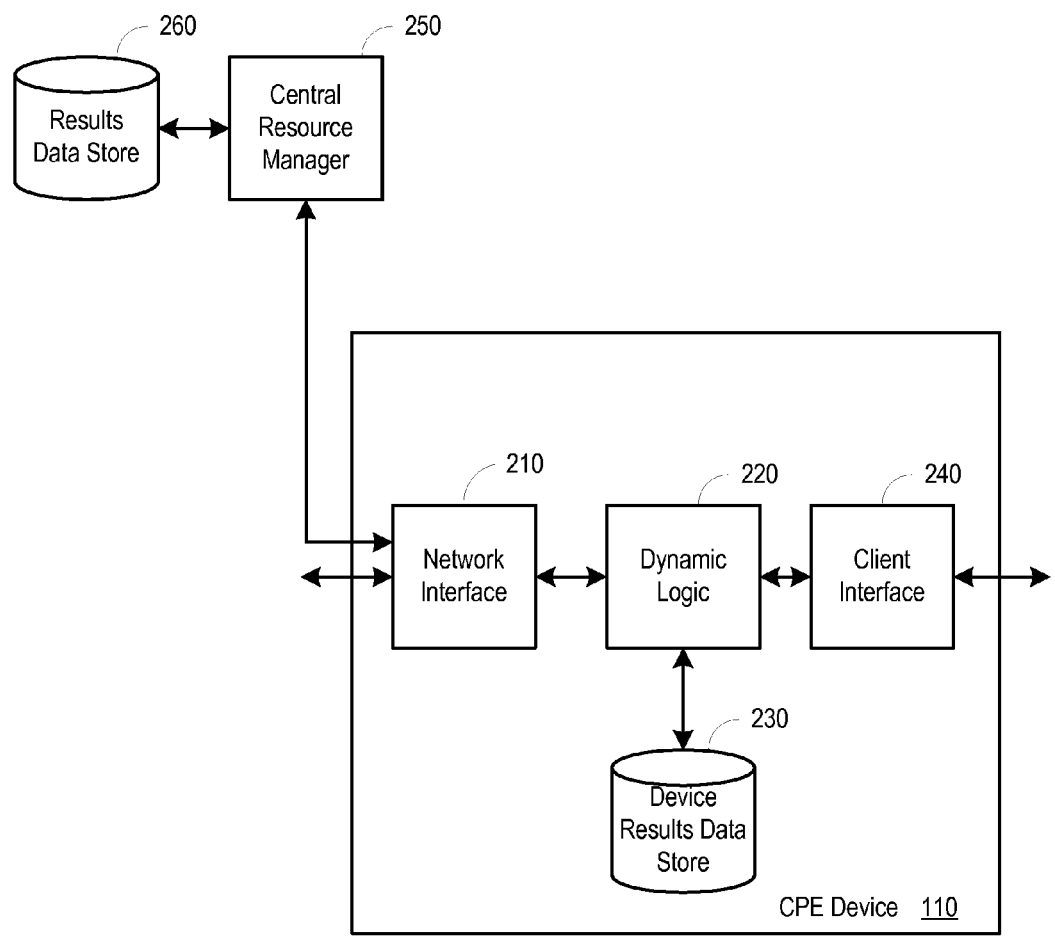
FIG. 2 is a block diagram illustrating an example CPE device operable to receive minor tasks, complete the task and send results to a central resource manager.

FIG. 2 is a block diagram illustrating an example of a CPE device 110 operable to receive a minor task, complete the minor task and send results to a central resource manager. In some implementations, the CPE device 110 can include a network interface 210, a dynamic logic 220, a device results data store 230, and a client interface 240.

The network interface 210 (e.g., an HFC interface) can be used to provide an interface to a network (e.g., HFC network 120 of FIG. 1). It should be understood that in other devices, the network interface 210 can be replaced by a generic network or peripheral interface to a local area network (LAN) or wide area network (WAN). In some implementations, the CPE device 110 can communicate with a central resource manager 250 through the network interface 210.

In some implementations, the central resource manager 250 can divide a processing task into minor tasks. The number of minor tasks the processing task is divided into can be determined, for example, based on the number of CPE devices connected to the network 120 of FIG. 1, the amount of available CPE device resources, or the amount of time within which the processing task must be completed. For example, if the processing task requires immediate completion, the processing task can be divided into a number of minor tasks based on the number of CPE devices connected to a network 120 of FIG. 1 that are not using their computing resources to complete their normal operation. In other implementations, if the processing task does not require immediate completion, the processing task can be divided into a number of minor tasks based on the total number of CPE devices connected to a network 120 of FIG. 1. In some implementations, the central resource manager 250 can send a minor task to a dynamic logic 220 (e.g., a processor) through a network interface 210. In this implementation, the dynamic logic 220 can complete the minor task and send the results to the central resource manager 250 through the network interface 210.

The dynamic logic 220 can be used to complete a minor task assigned to it by a central resource manager 250. In some implementations, the dynamic logic 220 can be a portion of the CPE device's processor that is harnessed to complete the minor task (e.g., the portion of the CPE device's processor that is not being used to complete the device's normal operation). For example, if the minor task is associated with a real-time processing task that requires immediate completion or consistent action, the central resource manager 250 can specify a time constraint within which the minor task must be completed by the CPE device to which the minor task is assigned. In this example, the dynamic logic 220 can be any portion of the CPE device's processor needed to complete the minor task within the time constraint. In another implementation, if the minor task is associated with a non-real-time processing task, the central resource manager 250 can prioritize the minor task. For example, if the minor task is given a low priority, the dynamic logic 220 can be only a portion of the CPE device's processor that is not being used by the device to complete its normal operation. In this example, if the minor task is given a high priority, but is not associated with a real-time processing task, the dynamic logic 220 can be a portion of the CPE device's processor that can be used to complete the minor task without preventing the device from carrying out its normal operation.

In some implementations, the results of the minor task can be stored by the CPE device in a device results data store 230. For example, the device results data store 230 can be located in the CPE device's storage or memory component (e.g., random-access memory (RAM), read-only memory (ROM), optical storage, flash memory, etc.). In some implementations, the device results data store 230 can store the results of the minor task until a confirmation has been received by the device from the central resource manager 250 that the results have been stored in an external results data store 260. In other implementations, the device results data store 230 can store the results of the minor task only if the CPE device's memory components can support the storage needed by the results.

In some implementations, the results of the minor task can be stored by the central resource manager 250 in an external results data store 260. For example, the external results data store 260 can be located in storage connected to the central resource manager 250 (e.g., mass storage device). In some implementations, results from individual minor tasks can be stored in the external results data store 260 until the results from all of the minor tasks associated with the same processing task have been received by the central resource manager 250 and stored. When results from all of the minor tasks associated with the same processing task have been received and stored, they can be compiled to create a final result of the completed processing task. In other implementations, results from minor tasks associated with the same processing task can be compiled as they are received by the central resource manager 250.

The client interface 240 is operable to provide a client interface, for example, to a host computer in the case of a cable modem or MTA device, or to a television for a set top box, etc. In some implementations, the central resource manager 250 can identify a CPE device and determine whether the computing resources of the device are idle. If the computing resources are idle, the central resource manager 250 can send the device a minor task. If the computing resources are not idle, the central resource manager 250 can determine whether the computing resources of the device can be virtualized. If the computing resources can be virtualized, the central resource manager 250 can virtualize the device's resources by determining the amount of the device resources needed to complete the normal operations of the device and allocating the remainder of the device's resources for completing the minor task assigned to the device by the central resource manager 250.

In some implementations, the central resource manager 250 and CPE devices 110 can provide video on demand (VoD)-like server functionality. For example, small portions of content can be stored at thousands of customer locations, and a video stream can be delivered to a customer by the resource manager instructing each of the thousands of CPE devices 110 to serve the small portions of content stored by the CPE device to the requesting customer device. In additional implementations, the CPE devices 110 can provide redundancy (e.g., backup storage) to the VoD functionality of the network.

In further implementations, the central resource manager 250 can tailor a minor task based upon type of CPE device 110. For example, a central resource manager 250 might classify CPE devices into video devices and modem devices. In this example, the central resource manager 250 can identify video related tasks for the video devices and signal processing or computation tasks for the modem devices. In still further implementations, the CPE devices can be classified based upon processing power. For example, DOCSIS 3.0 devices can be given more computationally intensive or real-time minor tasks, while legacy DOCSIS CPE devices can be given less computationally intensive and/or non-real-time minor tasks.

Figure 3:
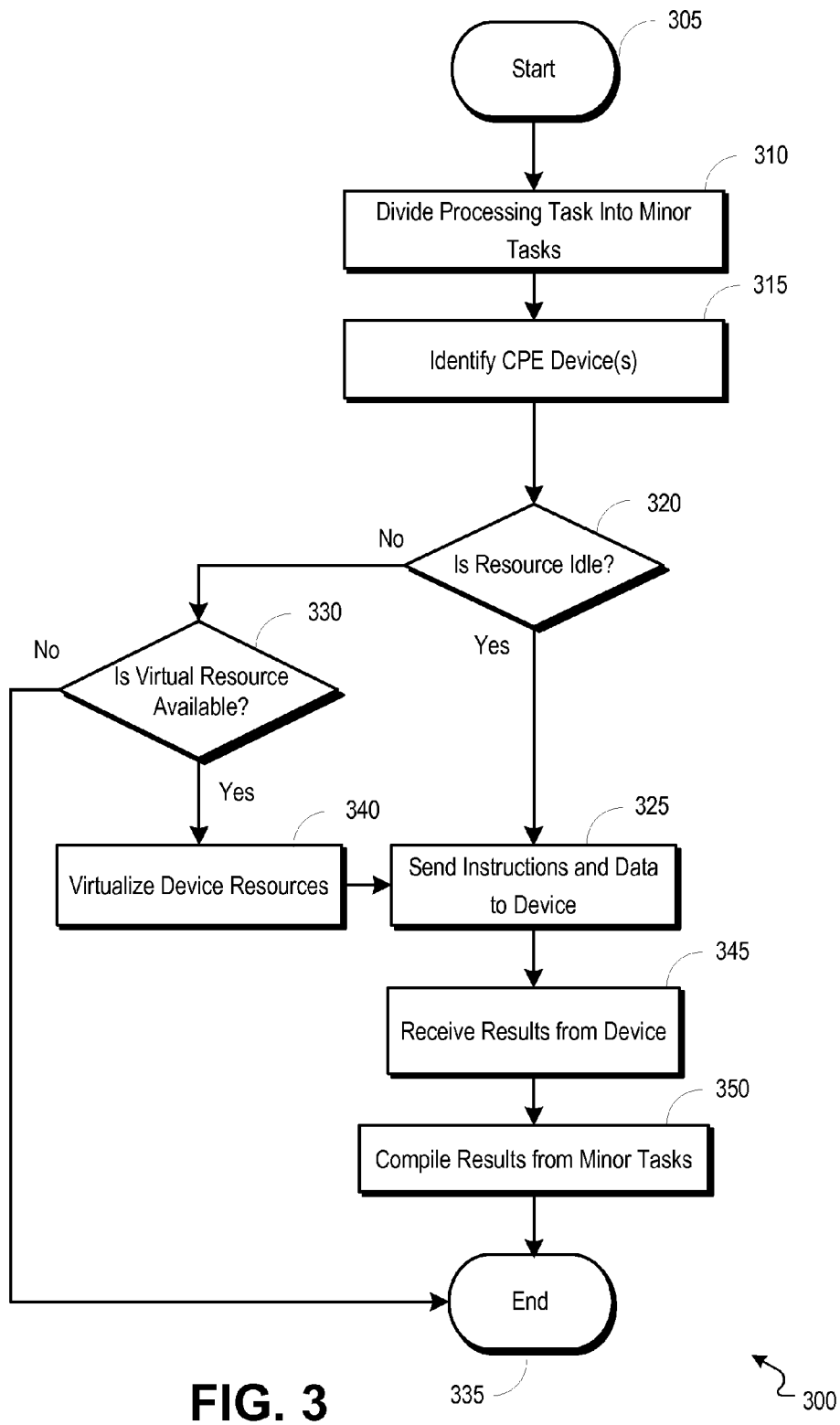
FIG. 3 is a flowchart illustrating an example process operable to harness computing resources in CPE devices.

FIG. 3 is a flowchart illustrating an example process 300 operable to harness computing resources in CPE devices. The process 300 can start at stage 305 when a central resource manager receives a processing task. The processing task can be, for example, a real-time task such as video transcoding or video serving, or a non-real-time such as data computation.

At stage 310, the processing task can be divided into minor tasks. The processing task can be divided into minor tasks, for example, by a central resource manager (e.g., central resource manager 250 of FIG. 2). In some implementations, the number of minor tasks the processing task is divided into can depend on the number of CPE devices under the control of the service provider. For example, the processing task can be divided into a number of minor tasks equal to the number of CPE devices connected to a network 120 of FIG. 1. In other implementations, the number of minor tasks the processing task is divided into can depend on the amount of available CPE device resources, or the amount of time within which the processing task must be completed. For example, if the processing task requires immediate completion, the processing task can be divided into a number of minor tasks equal to the number of idle CPE devices connected to a network (e.g., CPE devices that are not using their computing resources to complete their normal operation).

At stage 315, a CPE device under the control of a service provider can be identified. The CPE device can be identified, for example, by a central resource manager (e.g., central resource manager 250 of FIG. 2). For example, the central resource manager can identify a CPE device connected to a network (e.g, HFC network 120 of FIG. 1) based on the CPE devices registered with a headend 105 of FIG. 1. In some implementations, when the central resource manager 250 identifies a CPE device, the CPE device can be classified (e.g., as a video/data device or as having low/high processing power).

At stage 320, a determination can be made whether computing resources of the identified CPE device are idle. The determination can be made, for example, by a central resource manager (e.g., central resource manager 250 of FIG. 2). In some implementations, the central resource manager can query the CPE device, and the CPE device can respond that it is either idle or that it is busy. For example, the central resource manager 250 of FIG. 2 can query an identified CPE device periodically at a frequency determined and set by an MSO. Alternatively, the CPE device can periodically report its resource usage. In still further alternatives, a central resource manager can track the data requests received from the CPE device and determine that the device is idle based upon identifying that the CPE device has not initiated any data requests (or a minimal number of data requests) for a predetermined period of time prior to being identified as idle. If the computing resources of the identified CPE device are idle, then the process 300 can proceed to stage 325 and send the minor task to the identified CPE device.

In other implementations, stage 320 is optional and can be skipped. In such implementations, the process 300 can proceed to stage 325 and send the minor task to the identified CPE device. For example, if the processing task is not limited by a time constraint, such as a massive data computation, the associated minor tasks can be sent to CPE devices without first determining whether the computing resources of the CPE devices are idle.

If the computing resources of the identified CPE device are not idle, then the process 300 can proceed to stage 330 and a determination can be made whether the computing resources of the identified CPE device can be virtualized. The determination whether the computing resources of the identified CPE device can be virtualized can be made, for example, by a central resource manager (e.g., central resource manager 250 of FIG. 2). In some implementations, the central resource manager can query the CPE device to determine whether it has the capability to allocate an amount of its computing resources (e.g., central processing unit (CPU), memory, etc.) for completing a minor task. If it is determined that the CPE device is not capable of virtualizing its computing resources, then the process 300 can end at stage 335.

If the CPE device is capable of virtualizing its computing resources, then the process 300 can proceed to stage 340 and the computing resources of the identified CPE device can be virtualized. The computing resources of the identified CPE device can be virtualized, for example, by a central resource manager (e.g., central resource manager 250 of FIG. 2) in combination with a dynamic logic (e.g., dynamic logic 220 of FIG. 2). In some implementations, the resources not being used by the CPE device can be allocated for completing a minor task. In other implementations, a predetermined amount of computing resources at the identified CPE device can be allocated for completing a minor task as instructed by the central resource manager.

After virtualizing the computing resources of the identified CPE device, the process 300 can proceed to stage 325. At stage 325, a minor task is sent to the identified CPE device. The minor task can be sent, for example, by a central resource manager (e.g., central resource manager 250 of FIG. 2). In some implementations, the minor task can be received through the CPE device's network interface (e.g., network interface 210 of FIG. 2) and can be completed by the device's processor (e.g., dynamic logic 220 of FIG. 2). In some implementations, the minor task can be prioritized to inform the CPE device as to what amount of its computing resources to allocate to the task.

After a minor task has been sent to the identified CPE device, the device can complete the task and the process 300 can proceed to stage 345. At stage 345, the results of the minor task can be received from the CPE device. The results can be received, for example, by a central resource manager (e.g., central resource manager 250 of FIG. 2). In some implementations, the minor task can be completed by the CPE device's processor (e.g., dynamic logic 220 of FIG. 2) and the results of the completed minor task can be sent to the central resources manager 250 of FIG. 2 through the device's network interface (e.g., network interface 210 of FIG. 2). In some implementations, the results of the minor task can be stored on the CPE device, for example, in the memory or storage of the device (e.g., device results data store 230 of FIG. 2). For example, the results of the minor task can be stored in the device results data store 230 of FIG. 2 until the central resource manager 250 of FIG. 2 confirms that it has received the results. In some implementations, the results of the minor task can be stored in a network or memory external to the CPE device, for example, in memory or storage connected to a central resource manager (e.g., results data store 260 of FIG. 2).

After results of a minor task have been received from the identified CPE device, the process 300 can proceed to stage 350 and the results from minor tasks associated with a processing task can be compiled. The results of the minor tasks can be compiled, for example, by a central resource manager (e.g., central resource manager 250 of FIG. 2). In some implementations, results can be compiled when results from all minor tasks associated with the same processing task have been received from the CPE devices. In other implementations, results can be compiled with results from other minor tasks associated with the same processing task as the results are received from the CPE devices. After results from minor tasks are compiled, the process 300 can proceed to stage 335 where the process 300 ends.

Figure 4:
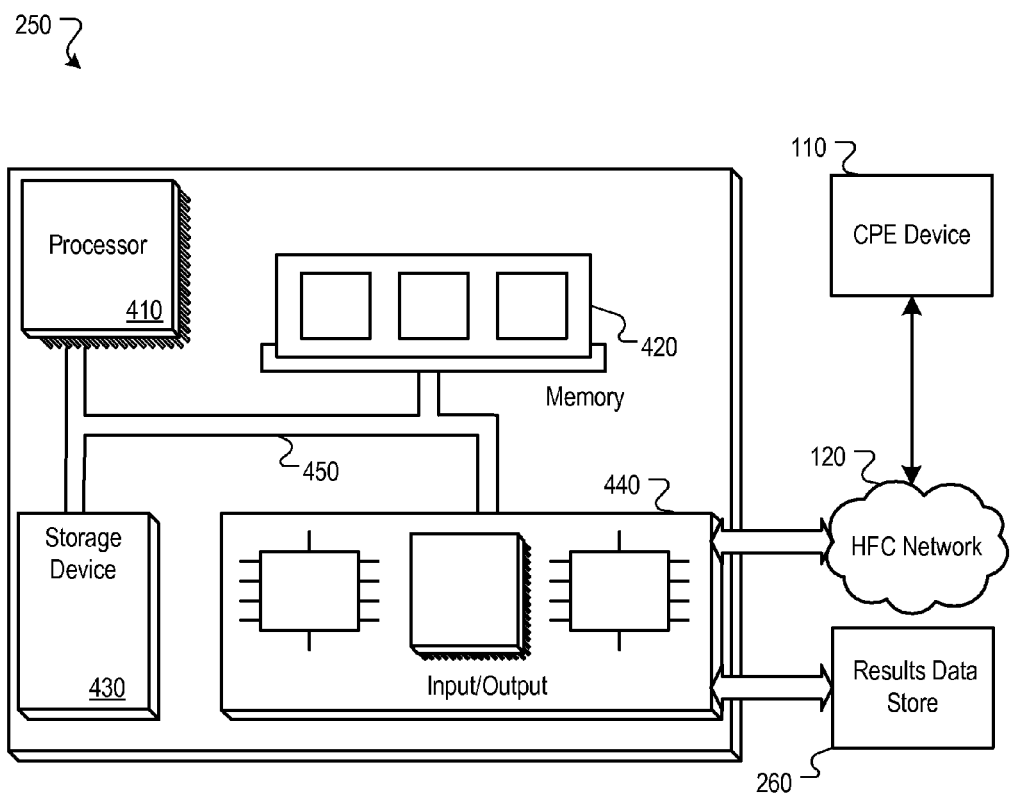
FIG. 4 is a block diagram of a hardware configuration for a central resource manager operable to harness computing resources in CPE devices.

FIG. 4 is a block diagram of an example hardware configuration for a central resource manager 250 operable to harness computing resources in CPE devices. While a central resource manager is shown in this example, it should be understood that many different kinds of devices (e.g., including network hubs, bridges, routers, edge termination devices, etc.) can implement a method to harness computing resources. The central resource manager 250 can include a processor 410, a memory 420, a storage device 430, and an input/output device 440. Each of the components 410, 420, 430, and 440 can, for example, be interconnected using a system bus 450. The processor 410 is capable of processing instructions for execution within the device 250. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the hardware configuration 250. In one implementation, the memory 420 is a computer-readable medium. In one implementation, the memory 420 is a volatile memory unit. In another implementation, the memory 420 is a non-volatile memory unit.

In some implementations, the storage device 430 is capable of providing mass storage for the device 250. In one implementation, the storage device 430 is a computer-readable medium. In various different implementations, the storage device 430 can, for example, include a hard disk device, an optical disk device, flash memory or some other large capacity storage device.

The input/output device 440 provides input/output operations for the hardware configuration 250. In one implementation, the input/output device 440 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In some implementations, the input/output device can include driver devices configured to receive input data and send output data to a results data store 260. In another implementation, the input/output device can include driver devices configured to receive input data and send output data to other input/output devices, such as one or more CPE devices 110 (e.g., set top box, cable modem, etc.), as well as sending communications to, and receiving communications from a network 120.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   identifying a plurality of customer premise equipment devices that have one or more available resources, wherein customer premise equipment devices that have one or more available resources comprise customer premise equipment devices that are idle and/or customer premise equipment devices capable of virtualizing available computing resources;
   associating a processing task with a priority level;
   dividing the processing task into a plurality of minor tasks, wherein a number of minor tasks the processing task is divided into is based upon an amount of time within which the processing task must be completed, wherein:
      in a case the amount of time indicates immediate completion of the processing task is required, setting the number of minor tasks equal to a number of customer premise equipment devices that are idle; and
      in a case the amount of time indicates the processing task does not require immediate completion, setting the number of minor tasks equal to a number of customer premise equipment devices that have one or more available resources;
   assigning each minor task to one or more of the plurality of identified customer premise equipment devices;
   outputting a message to each of the identified customer premise equipment devices, wherein each message instructs the respective customer premise equipment device to allocate available resources at the respective customer premise equipment device to the completion of the minor task assigned to the respective customer premise equipment device, wherein available resources at the respective customer premise equipment device are allocated based on the priority level associated with the processing task; and
   receiving results of a completed minor task from one or more of the plurality of identified customer premise equipment devices.

2. The computer-implemented method of claim 1, wherein a customer premise equipment device is determined to be idle if the customer device does not receive or request to transmit data for a predetermined period of time.

3. The computer-implemented method of claim 1, wherein a customer premise equipment device is determined to be idle if the customer device does not receive or request to transmit more than a nominal amount of data over a predetermined period of time.

4. The computer-implemented method of claim 1, wherein the status of a customer premise equipment device is predicted based upon the history of the customer premise equipment device's activity.

5. The computer-implemented method of claim 1, further comprising:
   wherein the processing task is associated with a low priority level;
   assigning the one or more minor tasks to customer premise equipment devices capable of virtualizing available computing resources;
   virtualizing available computing resources of each customer premise equipment device, wherein available computing resources of the customer premise equipment device comprise computing resources not being used during the normal operation of the device; and
   allocating the virtualized resources for a minor task.

6. The computer-implemented method of claim 1, further comprising:
   consolidating results from the completed minor tasks associated with the same processing task.

7. The computer-implemented method of claim 1, wherein the processing task comprises real-time video transcoding or data computation.

8. The computer-implemented method of claim 1, wherein the minor task comprises storing a portion of content on the storage components of the one or more of the plurality of identified customer premise equipment devices.

9. The computer-implemented method of claim 8, further comprising:
   scheduling delivery of the portions of the content from the one or more customer premise equipment devices to a device from which a request for the content is received; and
   outputting a message to each of the one or more customer premise equipment devices, the message instructing the respective customer premise equipment device to transmit a portion of the content to the device from which a request for the content is received.

10. The computer-implemented method of claim 1, further comprising:
   sending the results of the completed minor task to a third party.

11. The computer-implemented method of claim 1, wherein a customer premise equipment device is determined to be idle if a status report received from the customer premise equipment device indicates that the customer premise equipment device has one or more idle resources.

12. The computer-implemented method of claim 1, wherein the message output to each respective identified customer premise equipment devices comprises instructions for carrying out the task, the instructions comprising a time constraint defining a period of time within which the task is to be completed by the respective customer premise equipment device, the time constraint being based upon a priority level associated with the task.

13. The computer-implemented method of claim 1, further comprising:
   determining that one or more of the plurality of minor tasks are not limited by a time constraint; and
   assigning the one or more minor tasks that are not limited by a time constraint to one or more customer premise equipment devices whether or not the one or more customer premise equipment devices have available computing resources.

14. The computer-implemented method of claim 1, further comprising:
   wherein the processing task is associated with a high priority level;
   assigning the one or more minor tasks only to customer premise equipment devices that are idle.

15. A system, comprising:
   a data store that stores computer program instructions and provides storage for results of one or more of a plurality of minor tasks received from one or more of a plurality of customer premise equipment devices;
   a processor that executes said computer program instructions, the computer program instructions causing the processor to:
      identify the plurality of customer premise equipment devices based upon whether one or more resources of the customer premise equipment devices are idle, wherein customer premise equipment devices that have one or more idle resources comprise customer premise equipment devices that are idle and/or customer premise equipment devices capable of virtualizing available computing resources;
      associate a processing task with a priority level; and
      divide the processing task into the plurality of minor tasks, wherein a number of minor tasks the processing task is divided into is based upon an amount of time within which the processing task must be completed, wherein:
         in a case the amount of time indicates immediate completion of the processing task is required, the number of minor tasks is set equal to a number of customer premise equipment devices that are idle; and
         in a case the amount of time indicates the processing task does not require immediate completion, the number of minor tasks is set equal to a number of customer premise equipment devices that have one or more available resources; and
   an interface that:
      assigns each minor task to one or more of the plurality of identified customer premise equipment devices;
      outputs a message to each of the identified customer premise equipment devices, wherein each message instructs the respective customer premise equipment device to allocate available resources at the respective customer premise equipment device to the completion of the minor task assigned to the respective customer premise equipment device, wherein available resources at the respective customer premise equipment device are allocated based on the priority level associated with the processing task; and
      receives results of the one or more of the plurality of completed minor tasks from the one or more of the plurality of identified customer premise equipment devices.

16. The system of claim 15, wherein a customer premise equipment device is identified as idle if the customer device does not receive data or request to transmit data for a predetermined period of time or if the customer device does not receive data or request to transmit more than a nominal amount of data over a predetermined period of time.

17. The system of claim 15, wherein said interface is further used to:
   virtualize available computing resources of one or more of the identified customer premise equipment devices capable of virtualizing available computing resources; and
   allocate the virtualized resources for a minor task.

18. The system of claim 15, wherein said computer program instructions further cause the processor to:
   consolidate results from the completed minor tasks associated with the same processing task.

19. The system of claim 15, wherein the minor task comprises storing a portion of content on the storage components of the one or more of the plurality of identified customer premise equipment devices.

20. One or more non-transitory computer readable media operable to execute on a processor, the computer readable being operable to cause the processor to perform the operations comprising:
   identifying a plurality of customer premise equipment devices that have one or more idle resources, wherein customer premise equipment devices that have one or more idle resources comprise customer premise equipment devices that are idle and/or customer premise equipment devices capable of virtualizing available computing resources;
   associating a processing task with a priority level;
   dividing the processing task into a plurality of minor tasks, wherein a number of minor tasks the processing task is divided into is based upon an amount of time within which the processing task must be completed, wherein:
      in a case the amount of time indicates immediate completion of the processing task is required, setting the number of minor tasks equal to a number of customer premise equipment devices that are idle; and
      in a case the amount of time indicates the processing task does not require immediate completion, setting the number of minor tasks equal to a number of customer premise equipment devices that have one or more available resources;
   assigning each minor task to one or more of the plurality of identified customer premise equipment devices;
   outputting a message to each of the identified customer premise equipment devices, wherein each message instructs the respective customer premise equipment device to allocate available resources at the respective customer premise equipment device to the completion of the minor task assigned to the respective customer premise equipment device, wherein available resources at the respective customer premise equipment device are allocated based on the priority level associated with the processing task; and receiving results of a completed minor task from one or more of the plurality of identified customer premise equipment devices.

21. The non-transitory computer-implemented method of claim 20, wherein a customer premise equipment device is identified as idle if the customer device does not receive data or request to transmit data for a predetermined period of time or if the customer device does not receive or request to transmit more than a nominal amount of data over a predetermined period of time.

22. The one or more non-transitory computer-readable media of claim 20, further operable to cause the processor to perform the operations comprising:
   virtualizing available computing resources of one or more of the identified customer premise equipment devices capable of virtualizing available computing resources; and
   allocating the virtualized resources for a minor task.

23. The one or more non-transitory computer-readable media of claim 20, further operable to cause the processor to perform the operations comprising:
   consolidating results from the completed minor tasks associated with the same processing task.

24. The one or more non-transitory computer-readable media of claim 20, wherein the processing task comprises real-time video transcoding or data computation.

25. The one or more non-transitory computer-readable media of claim 20, wherein the minor task comprises storing a portion of content on the storage components of the one or more of the plurality of identified customer premise equipment devices.

* * * * *